United States Patent [19]

Pinault

[11] Patent Number: 4,547,354

[45] Date of Patent: Oct. 15, 1985

[54] PROCESS FOR PREPARING HYDROGEN PEROXIDE

[75] Inventor: Frances S. Pinault, Hopewell, N.J.

[73] Assignee: Atlantic Richfield Company, Los Angeles, Calif.

[21] Appl. No.: 547,193

[22] Filed: Oct. 31, 1983

[51] Int. Cl.[4] .............................................. C01B 15/02
[52] U.S. Cl. ..................................... 423/587; 568/918
[58] Field of Search ......................... 568/918; 423/587

[56] References Cited

U.S. PATENT DOCUMENTS

| | | | |
|---|---|---|---|
| 2,949,343 | 8/1960 | Hood et al. | 423/587 |
| 3,737,518 | 6/1973 | Bonetti et al. | 423/587 |
| 3,891,748 | 6/1975 | Rosenthal et al. | 423/587 |
| 4,399,000 | 8/1983 | Tedder | 568/918 |

FOREIGN PATENT DOCUMENTS

| | | | |
|---|---|---|---|
| 552414 | 1/1958 | Canada | 423/587 |
| 410816 | 5/1934 | United Kingdom | 568/918 |
| 230804 | 3/1969 | U.S.S.R. | 568/918 |

*Primary Examiner*—John Doll
*Assistant Examiner*—Wayne A. Langel
*Attorney, Agent, or Firm*—Craig E. Larson

[57] ABSTRACT

An improved process for the acid-catalyzed hydrolysis tertiary butyl hydroperoxide to form hydrogen peroxide wherein an organic solvent is added to the hydrolysis zone, which solvent promotes the partitioning of hydrogen peroxide and oxidizable organic material into separate aqueous and organic phases, respectively.

3 Claims, No Drawings

PROCESS FOR PREPARING HYDROGEN PEROXIDE

BACKGROUND OF THE INVENTION

1. FIELD OF THE INVENTION

This invention relates to the preparation of hydrogen peroxide by acid catalyzed hydrolysis of tertiary butyl hydroperoxide.

2. DESCRIPTION OF THE PRIOR ART

U.S. Pat. No. 3,737,518 describes a method for producing hydrogen peroxide and alcohol by reacting an organic hydroperoxide and water at a temperature of from 60° C. to 130° C. in an aqueous acid solution containing from 1 to 40 wt. % acid. Concentrations of the organic hydroperoxide can be from about 1 to about 50 wt. % based on the reactants, depending on the particular system used. The hydroperoxide reacts with the water on an equal molar basis to produce 1 mole of hydrogen peroxide and 1 mole of alcohol. Tertiary butyl hydroperoxide is disclosed as a suitable organic hydroperoxide reagent.

U.S. Pat. No. 3,891,748 discloses an acid catalyzed process for the production of hydrogen peroxide from tertiary butyl hydroperoxide wherein tertiary butyl hydroperoxide is continuously contacted with water in the presence of an acid in a contacting zone operated under conditions such that tertiary butyl alcohol product is continuously removed overhead and hydrogen peroxide is recovered from the bottom stream. A suitable contacting zone is a fractionating column with a reboiler system provided at the bottom of the column. Aqueous acid solution is introduced at the upper end of the fractionating column and tertiary butyl hydroperoxide is introduced at the lower end of the column. A mixture of unreacted tertiary butyl hydroperoxide, tertiary butyl alcohol, water, and volatile organic by-products is recovered overhead. Most of the reaction occurs in the fractionating column employed in the U.S. Pat. No. 3,891,748 process.

The method of the U.S. Pat. No. 3,891,748 minimizes the usual side reactions associated with acid catalyzed hydrolysis such as the reaction of tertiary butyl alcohol with hydrogen peroxide or with tertiary butyl hydroperoxide to form di-tert-butyl peroxide. See the following equation:

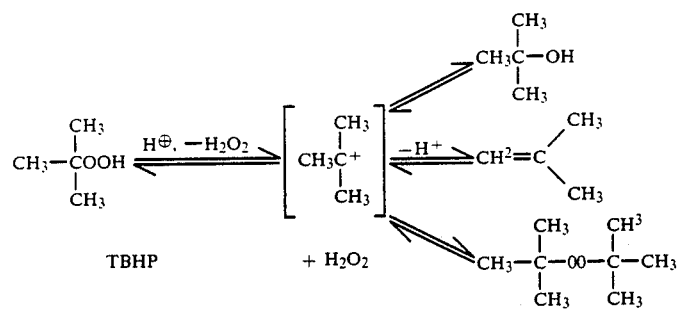

A key advantage of the U.S. Pat. No. 3,891,748 process is that it allows tertiary butyl alcohol to be stripped from the reaction zone as it is formed, driving the hydrolysis reaction towards completion. However, production of nonselective co-products—noteably di-tertiary butyl peroxide—remains a problem. Additional disadvantages of these prior art methods are moderate hydrogen peroxide selectivities and the low concentration (less than 1 wt. %) of hydrogen peroxide in the aqueous product stream recovered from the reaction zone.

Accordingly, an object of the present invention is an improved method for producing hydrogen peroxide by the acid catalyzed hydrolysis of tertiary butyl hydroperoxide. A further object is the conversion of tertiary butyl peroxide with enhanced selectivities to the hydrogen peroxide product and to desirable tertiary butyl alcohol and isobutylene by-products. A still further object is an acid catalyzed hydrolysis process which produces a more concentrated hydrogen peroxide product stream.

SUMMARY OF THE INVENTION

In accordance with the present invention, it is now been found that hydrogen peroxide selectivities are enhanced and that a more concentrated hydrogen peroxide product is obtained when tertiary butyl hydroperoxide is hydrolyzed with an aqueous acid solution in the presence of selected oganic solvents. Solvents selected for the practice of the present invention promote the partitioning of two phases: (1) an organic phase comprising tertiary butyl alcohol and oxidizable organic hydrolysis byproducts (especially acetone and methanol) and (2) an aqueous acid phase containing hydrogen peroxide. The solvent should be inert to peroxides and acids and should be water insoluble. Suitable solvents include chlorobenzene, ortho-dichlorobenzene, 1,1,1-trichloroethane, 1,2-dichoroethane, nitrobenzene, and anisole.

By selective partitioning of hydrogen peroxide from oxidizable organic materials such as methanol and acetone in separate liquid phases, product losses are minimized. Hydrogen peroxide is more selectively partitioned into the aqueous phase than when the organic phase composed of mainly tertiary butyl hydroperoxide. This partitioning effect minimizes contact between hydroperoxide and oxidizable organic material, thus increasing hydroperoxide stability. Furthermore, use of partitioning solvents such as those described enables crude separations of tertiary hydroperoxide and/or organic products from hydrogen peroxide without distillation. This in turn eliminates difficulties caused by azeotrope formation and eases the final separation of a more concentrated hydrogen peroxide product.

DETAILED DESCRIPTION OF THE INVENTION

Feed to the process of this invention can be pure tertiary butyl hydroperoxide, but preferably tertiary butyl hydroperoxide is provided as commercially available isobutane oxidate. Such oxidates comprise tertiary butyl hydroperoxide admixed with tertiary butyl alcohol. Tertiary butyl hydroperoxide will typically range from about 50 wt. % of the oxidate up to 70 wt. %, with the remainder being predominantly tertiary butyl alochol and minor amounts of other isobutane oxidation products such as water, methanol and lower molecular weight acids, esters, and ketones. Crude oxidate product of processes such as are disclosed in U.S. Pat. Nos. 2,845,461 or 3,478,108 can be fed to the process of this invention or the tertiary butyl hydroperoxide can be purified by conventional means. Crude oxidate is preferred because of its lower cost. The amount of tertiary butyl hydroperoxide provided preferably ranges from about 10 to 40 wt. % of the total feed in the hydrolysis zone.

The acids employed as catalysts may be any of those disclosed in U.S. Pat. No. 3,737,518: inorganic mineral acids such as sulfuric, hydrochloric, or phosphoric acids; sources of acid such as potassium acid sulfate, boron acid sulfate, or ion exchange resins in acid form; and organic acids such as para-toluene-sulfonic acid. Sulfuric acid is preferred. The acid is present in amount sufficient to catalyze the hydrolysis reaction and is suitably provided with reactant water as an aqueous solution. Acid concentrations can range between about 1 to 40 wt. %, based on acid and water. Preferred concentrations are within the range of about 5 to 30 wt. %. The amount of acid may range from about 5 to 25 wt. % of the total feed to the hydrolysis zone.

Hydrolysis zone temperature should be maintained within the range of about 80° to 125° C., preferably within the range of about 85° to 110° C. Operating pressures are preferably within the range of about 200 to 2280 mm. Hg.

Reaction time is dependent upon temperature and may generally be within the range of about 1 to 20 hours, preferably about 1 to 8 hours.

Stabilizers may be optionally added to prevent decomposition and to pick up metal contaminants. Suitable stabilizers include sodium pyrophosphate and potassium pyrophosphate. If used, stabilizer concentration will generally be within the range of 0.-5 to 0.5 wt. % of the total feed to the hydrolysis zone.

As noted, the organic solvent employed in the present invention is selected according to its ability to selectively partition hydrogen peroxide into the aqueous phase present in the hydrolysis zone and by its ability to selectively partition oxidizable organic material into the organic phase present in the hydrolysis zone. The solvent of course must also be present as a liquid under the hydrolysis conditions. Selectivity to desired products generally improves as the amount of solvent provided increases. However, improved product selectivities are obtained at the expense of lower conversions of tertiary butyl hydroperoxide. Preferably, the amount of solvent provided is within the range of about 20 to 60 wt. % of the total feed to the hydrolysis zone, more preferably within the range of about 25 to 45 wt. %. Preferred organic solvents are selected from the group consisting of orthodichlorobenzene, chlorobenzene, 1,1,1-trichloroethane, 1,2-dichloroethane, nitrobenzene and anisole. More preferred are chlorobenzene, and especially ortho-dichlorobenzene.

In carrying out the process of this invention, tertiary butyl hydroperoxide, acid, water and the selected organic solvent are introduced to a hydrolysis zone and are contacted under the conditions described above. The presence in the contact zone of tertiary butyl alcohol formed during the hydrolysis reaction causes an equilibrium limitation of the hydrolysis reaction. Accordingly, in a preferred embodiment, tertiary butyl alcohol and lower boiling oxidizable organic material are continuously removed from the reaction mixture. This is conveniently accomplished by introducing a non-condensable gas such as nitrogen into the hydrolysis zone at a point above the liquid surface of the reaction mixture. Sweep gas is removed overhead to a condenser and receiver. Byproduct tertiary butyl alcohol is recovered from the condensate. Product hydrogen peroxide is recovered from the aqueous phase withdrawn from the hydrolysis zone. The following examples will further illustrate the practice of the present invention.

EXAMPLE 1

The abilities of various organic solvents to selectively partition hydrogen peroxide into the aqueous phase of a biphasic, tertiary butyl hydroperoxide hydrolysis reaction mixture were compared by extracting organic solutions of tertiary butyl hydroperoxide and its hydrolysis products with aqueous sulfuric acid. Results are shown in Table I below.

TABLE I

| | Organic Solvent | | | | | |
|---|---|---|---|---|---|---|
| | none | Clorobenzene | Ortho-dichlorobenzene | Nitrobenzene | Anisole | 1,2-Dichloroethane |
| Phase ratio[a] | 1.61 | 0.91 | 0.90 | 1.10 | 0.86 | 0.95 |
| Kd (wt)[b] | | | | | | |
| acetone | 2.43 | 1.80 | 0.93 | 1.20 | 1.40 | 1.81 |
| TBA | 3.94 | 2.60 | 1.35 | 1.66 | 1.79 | 1.65 |
| TBHP | 6.43 | 8.94 | 3.85 | 5.98 | 6.44 | 4.88 |
| $H_2O_2$ | 1.66 | 0.400 | 0.306 | 0.393 | 0.386 | 0.416 |
| Kd (conc)[c] | | | | | | |
| acetone | 1.51 | 1.96 | 1.02 | 1.33 | 1.64 | 1.90 |
| TBA | 2.44 | 2.86 | 1.50 | 1.82 | 2.07 | 1.73 |
| TBHP | 3.98 | 9.87 | 4.26 | 6.59 | 7.46 | 5.12 |

TABLE I-continued

|  | Organic Solvent | | | | | |
|---|---|---|---|---|---|---|
|  | none | Clorobenzene | Ortho-dichloro-benzene | Nitrobenzene | Anisole | 1,2-Dichloroethane |
| $H_2O_2$ | 1.03 | 0.440 | 0.338 | 0.357 | 0.455 | 0.432 |

*Phase ratio = wt. of organic phase/wt. of aqueous phase $^bKd(wt) = \frac{\text{wt. of component in organic phase}}{\text{wt. of component in aqueous phase}}$ $^cKd(conc) = \frac{\text{wt. \% of component in organic phase}}{\text{wt. \% of component in aqueous phase}}$ In order to minimize contact between hydrogen peroxide and oxidizable organic material, the distribution coefficient (Kd) for hydrogen peroxide should be as low as possible. In this respect, all of the organic solvents shown in Table I offer a significant improvement over the absence of solvent. Furthermore, the solvent employed in the process of this invention should have distribution coefficents for acetone, methanol, and especially tertiary butyl alcohol (which can react with hydrogen peroxide to form tertiary butyl hydroperoxide) that are as high as possible. Chlorobenzene is particularly beneficial in this latter regard.

Examples 2-3 and Comparative Examples A and B

These examples serve to illustrate hydrogen peroxide stability in the presence and absence of oxidizable organic byproducts such as methanol and acetone. These examples also show the effect of the organic solvents employed in the present process on hydrogen peroxide stability. All reactions were carried out at 95° C. for 4 hours in a flask (500 ml.) fitted with distillation head, condenser, and receiver. A nitrogen sweep of the system during the reaction was scrubbed with water and collected in a gas bag. The water solution from the scrubber was analyzed by gas chromatography for products and by spectrophotometry for hydrogen peroxide. Gases were analyzed by gas chromatography and the liquid products were similarily analyzed for organic products and hydrogen peroxide. Results are shown below in Table II.

TABLE II

| Example No. | A | 1 | B | 2 |
|---|---|---|---|---|
| Reactants |  |  |  |  |
| Hydrogen Peroxide (mmoles) IN | 104.0 | 93.6 | 104.8 | 104.2 |
| Chlorobenzene (g) | — | 40.0 | — | 40.0 |
| Concentrated Sulfuric Acid (g) | 4.1 | 4.0 | 4.0 | 4.0 |
| Water (g) | 52.0 | 52.8 | 52.3 | 52.8 |
| Acetone (g) | — | — | .62 | .63 |
| Methanol (g) | — | — | .41 | .40 |
| Hydrogen Peroxide (mmoles) Recovered | 111.7 | 94.1 | 3.2 | 69.4 |
| % Hydrogen Peroxide Recovery | 107 | 101 | 3 | 67 |

A key to hydrogen peroxide survival is the removal of oxidizable organics from the aqueous phase containing hydrogen peroxide. It is obvious from these examples that the chlorobenzene cosolvent is effective in partitioning the organics from hydrogen peroxide, thus minimizing hydrogen peroxide decomposition losses.

EXAMPLES 4-10 AND COMPARATIVE EXAMPLE C

The following examples illustrate the hydrogen peroxide yield improvement obtained by the process of the present invention. These examples employed the same apparatus and procedures described above in examples 2-3.

TABLE III

| Example No. | C | 4 | 5 | 6 | 7 | 8 | 9 | 10 |
|---|---|---|---|---|---|---|---|---|
| Reaction Conditions |  |  |  |  |  |  |  |  |
| Nitrogen Sweep Rate (liters/hr) | 6 | 6 | 5.2 | 6.0 | 3.1 | 4.0 | 6.0 | 6.0 |
| Time (hrs.) | 4 | 4 | 4 | 4 | 2 | 2 | 2 | 4 |
| Temperature (°C.) | 91 | 91 | 91 | 91 | 95 | 95 | 95 | 95 |
| Solvent | None | Chloro-benzene | Chloro-benzene | Chloro-benzene | Ortho-dichloro-benzene | Ortho-dichloro-benzene | Ortho-dichloro-benzene | Ortho-dichloro-benzene |
| Reactants (grams) |  |  |  |  |  |  |  |  |
| t-Butylhydroperoxide(TBHP) | 35.0 | 33.5 | 36.1 | 35.0 | 37.5 | 35.1 | 34.9 | 35 |
| Solvent | — | 40.8 | 60 | 60 | 60 | 60 | 60 | 60 |
| 10 wt. % Sulfuric Acid | 60 | 60 | 60 | 60 | 60 | 60 | 60 | 60 |
| Sodium Pyrophosphate | 0.2 | 0.2 | 0.2 | 0.2 | 0.2 | 0.2 | 0.2 | 0.2 |
| TBHP Conversion (wt. %) | 27.0 | 25.7 | 12.8 | 12.0 | 9.2 | 9.9 | 12.1 | 27.3 |
| % Hydrogen Peroxide Selectivity | 41.3 | 66.4 | 74.9 | 82.4 | 71.9 | 82.2 | 89.5 | 87.2 |
| Wt. % Hydrogen Peroxide (Aqueous Phase) | 1.10 | 3.74 | 2.17 | 2.27 | 1.42 | 1.83 | 2.39 | 4.72 |
| % Selectivity (others) |  |  |  |  |  |  |  |  |
| Methanol | — | 8.8 | 2.7 | 10.5 | 12.5 | 10.6 | 10.5 | 10.1 |
| Formic Acid | — | .6 | 3.3 | 1.5 | 1.3 | .7 | 3.2 | 2.1 |
| Acetone | — | 7.0 | 16.9 | 5.4 | 2.3 | 10.6 | 6.4 | 4.7 |
| Acetic Acid | — | 1.2 | 4.0 | 3.3 | 2.1 | .3 | 5.3 | 4.3 |
| t-butyl alcohol | 20.6 | 20.4 | 24.3 | 25.1 | 29.4 | 44.4 | 27.8 | 35.2 |
| Isobutylene | 10.8 | 25.6 | 36.4 | 42.5 | 31.5 | 9.6 | 42.5 | 45.8 |
| Di-t-butylperoxide | 37.2 | 10.3 | 13.2 | 15.5 | 25.5 | 26.4 | 13.7 | 12.6 |

Comparison of Examples 7, 8 and 9 demonstrates the effect of nitrogen sweep rate on process results. Steady increases in conversion and hydrogen peroxide selectivity are observed as nitrogen flow increases from 3.1 to 6.0 liters per hour. These improvements correlate with increasing amounts of tertiary butyl alcohol and other organic material taken overhead.

Comparison of Examples 4–6 with examples 7–10 indicates that ortho-dichlorobenzene promotes a much faster rate of reaction than observed with chlorobenzene. While not wishing to be bound by an theory of operability, it appears that this difference in rate is most likely due to the differences in distribution coefficients for tertiary butyl hydroperoxide in the two organic solvents. The distribution coefficient (Kd wt.) is 8.94 in simulated reaction mixtures containing chlorobenzene, but only 3.85 in mixtures containing ortho-dichlorobenzene. See Example 1. Therefore, more tertiary butyl hydroperoxide is in contact with the aqueous acid catalyst and the rate of reaction is thereby increased when ortho-dichlorobenzene used as the solvent.

What is claimed is:

1. In a process for the production of hydrogen peroxide wherein tertiary butyl hydroperoxide is contacted with water in the presence of an acid in a hydrolysis zone maintained at a temperature within the range of about 80° to 125° C., the improvement which comprises adding an organic solvent selected from the group consisting of ortho-dichlorobenzene, chlorobenzene, 1,1,1-trichloroethane, 1,2-dichloroethane, nitrobenzene and anisole to the hydrolysis zone to promote the partitioning of (a) tertiary butyl alcohol and organic hydrolysis byproducts comprising di-tertiary butyl peroxide, acetone and methanol and (b) hydrogen peroxide into separate organic and aqueous phases respectively, and recovering hydrogen peroxide product from the separated aqueous phase.

2. The method of claim 1 wherein said solvent is selected from the group consisting of ortho-dichlorobenzene and chlorobenzene.

3. The method of claim 1 wherein said solvent is ortho-dichlorobenzene.

* * * * *